(12) United States Patent
Uchida (10) Patent No.: US 9,561,643 B2
(45) Date of Patent: Feb. 7, 2017

(54) LIGHT IRRADIATION APPARATUS AND PRINTING APPARATUS

(71) Applicant: KYOCERA Corporation, Kyoto-shi, Kyoto (JP)

(72) Inventor: Shinya Uchida, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 17 days.

(21) Appl. No.: 14/654,781

(22) PCT Filed: Jan. 27, 2014

(86) PCT No.: PCT/JP2014/051637
§ 371 (c)(1),
(2) Date: Jun. 22, 2015

(87) PCT Pub. No.: WO2014/119500
PCT Pub. Date: Aug. 7, 2014

(65) Prior Publication Data
US 2015/0343795 A1   Dec. 3, 2015

(30) Foreign Application Priority Data

Jan. 30, 2013  (JP) ................. 2013-015583

(51) Int. Cl.
*B41J 2/45*   (2006.01)
*B41F 23/04*  (2006.01)
(Continued)

(52) U.S. Cl.
CPC .......... *B41F 23/0409* (2013.01); *B01J 19/123* (2013.01); *B41J 11/002* (2013.01); *F21V 29/51* (2015.01); *F26B 3/00* (2013.01)

(58) Field of Classification Search
CPC ........................................................ B41J 2/451
(Continued)

(56) References Cited

U.S. PATENT DOCUMENTS 7,643,047 B2 *  1/2010  Okazaki ................ B41J 2/45
                                                    347/238
8,016,407 B2 *  9/2011  Schierholz ............ B41J 11/002
                                                    347/102
(Continued)

FOREIGN PATENT DOCUMENTS

EP   2335819 A1   6/2011
JP   3158033 U    3/2010
(Continued)

OTHER PUBLICATIONS

International Search Report, PCT/JP2014/051637, Feb. 18, 2014, 1 pg.

*Primary Examiner* — Matthew Luu
*Assistant Examiner* — Lily Kemathe
(74) *Attorney, Agent, or Firm* — Volpe and Koenig, P.C.

(57) ABSTRACT

A light irradiation apparatus which has excellent maintainability despite an increase in its length and size is provided. A light irradiation apparatus includes a plurality of light irradiation modules arranged; and a casing which houses at least part of the plurality of light irradiation modules. The plurality of light irradiation modules each includes a light irradiation device, a heat-dissipating member, a cooling piping for supply, a cooling piping for discharge which discharges a coolant from the flow channel, an electrical wiring, and a cover. The casing includes a side-cover and an under-cover.

9 Claims, 6 Drawing Sheets

(51) Int. Cl.
  *F21V 29/51*   (2015.01)
  *B01J 19/12*   (2006.01)
  *B41J 11/00*   (2006.01)
  *F26B 3/00*    (2006.01)

(58) Field of Classification Search
  USPC .................................................. 347/102, 130
  See application file for complete search history.

(56) References Cited

U.S. PATENT DOCUMENTS

| | | | | |
|---|---|---|---|---|
| 8,294,742 B2* | 10/2012 | Itou | ........................... | B41J 2/451 347/130 |
| 8,362,100 B2* | 1/2013 | Ohno | ................... | C09D 11/101 427/511 |
| 2003/0052960 A1* | 3/2003 | Okazaki | ..................... | B41J 2/45 347/238 |
| 2003/0222961 A1* | 12/2003 | Nakajima | .............. | B41J 11/002 347/102 |
| 2007/0097200 A1* | 5/2007 | Okazaki | ..................... | B41J 2/45 347/236 |
| 2008/0174648 A1* | 7/2008 | Nakano | ................... | B41J 11/002 347/102 |
| 2008/0174649 A1* | 7/2008 | Nakano | ..................... | B41J 2/155 347/102 |
| 2011/0037826 A1* | 2/2011 | Itou | ........................... | B41J 2/451 347/257 |
| 2011/0115869 A1* | 5/2011 | Nakaie | ....................... | B41J 2/45 347/224 |

FOREIGN PATENT DOCUMENTS

| | | |
|---|---|---|
| JP | 2010-274256 A | 12/2010 |
| JP | 2012178303 A * | 9/2012 |
| WO | 2010/035593 A1 | 4/2010 |

\* cited by examiner

LIGHT IRRADIATION APPARATUS AND PRINTING APPARATUS

TECHNICAL FIELD

The present invention relates to a light irradiation apparatus used to cure ultraviolet cure resin and paint, and a printing apparatus.

BACKGROUND ART

Ultraviolet irradiation apparatuses have been used for general purposes, including fluorescence reaction observations in the fields of, for example, medicine and biotechnology, disinfection, the adhesion of electronic components, and the curing of ultraviolet cure resin and ink. For example, a high-pressure mercury lamp and a metal halide lamp are used as lamp light sources for an ultraviolet irradiation apparatus for use in, for example, the curing of ultraviolet cure resin used for the adhesion of a miniaturized component in, for example, the electronic component field, and the curing of ultraviolet curable ink used in the printing field.

In recent years, global environmental load reduction has been sought after on a worldwide basis, and this trend has led to an aggressive adoption of an ultraviolet light-emitting element, which has a relatively long service life expectancy, achieves energy savings, and is capable of reduction in ozone generation, as a lamp light source.

However, even if an ultraviolet light-emitting element which is capable of relatively successful reduction in heat generation is used as a lamp light source in an ultraviolet irradiation apparatus, depending on usage, heat liberated by the ultraviolet irradiation apparatus may cause a trouble such as a decline in the efficiency of emission of light from the ultraviolet light-emitting element, or shortening of the life expectancy of the ultraviolet light-emitting element. In this regard, for example, as disclosed in Patent Literature 1, a device for cooling ultraviolet irradiation apparatuses is proposed.

However, for example, when a printing apparatus incorporating such an ultraviolet irradiation apparatus which is thus long and large-sized is used, maintenance operation, such as replacement of an ultraviolet light-emitting element, has to be carried out after dismounting of the ultraviolet irradiation apparatus as a whole, which results in poor maintainability.

CITATION LIST

Patent Literature

Patent Literature 1: Japanese Utility Model Registration No. JP-U 3158033

SUMMARY OF INVENTION

Technical Problem

The invention has been devised in view of the problem as mentioned supra, and accordingly an object of the invention is to provide a light irradiation apparatus which has excellent maintainability despite an increase in its length and size, and a printing apparatus.

Solution to Problem

A light irradiation apparatus according to an embodiment of the invention comprises: a plurality of light irradiation modules arranged; and a casing which houses at least part of the plurality of light irradiation modules, wherein the plurality of light irradiation modules each comprises a light irradiation device in which a plurality of light-emitting elements are disposed on one main face thereof, a heat-dissipating member in which the light irradiation device is disposed on a first main face thereof, a cooling piping for supply which supplies a coolant to a flow channel provided inside the heat-dissipating member and a cooling piping for discharge which discharges a coolant from the flow channel, each of which is connected to a second main face of the heat-dissipating member, the second main face being located to be opposite to the first main face, an electrical wiring connected to the light irradiation device, the electrical wiring supplying power to the light irradiation device, and a cover configured to face with the second main face of the heat-dissipating member, the cover comprising through holes through which the cooling piping for supply, the cooling piping for discharge, and the electrical wiring are passed, the casing comprises a side-cover disposed along a direction from the light irradiation device toward the cover and configured to surround the plurality of light irradiation modules, and an under-cover which is connected to the side-cover, contacts with a portion of the cover of each of the plurality of light irradiation modules, and has openings through which the cooling piping for supply, the cooling piping for discharge, and the electrical wiring are passed.

A printing apparatus according to an embodiment of the invention comprises: a printing device printing on a recording medium; and the light irradiation apparatus according to any one of the above-mentioned embodiments, the light irradiation apparatus applying light to the recording medium printed.

Advantageous Effects of Invention

As described above, the light irradiation apparatus according to an embodiment of the invention comprises a plurality of light irradiation modules arranged, and a casing which houses at least part of the light irradiation modules. The light irradiation apparatus has excellent maintainability despite an increase in its length and size.

DESCRIPTION OF EMBODIMENTS

Hereinafter, embodiments of a light irradiation apparatus and a printing apparatus pursuant to the invention will be described with reference to drawings. It is noted that the following examples of the invention are given as illustrative only of embodiments of the invention, and thus the invention is not limited to the embodiments as described below.

<Light Irradiation Apparatus>

Figure 1A:
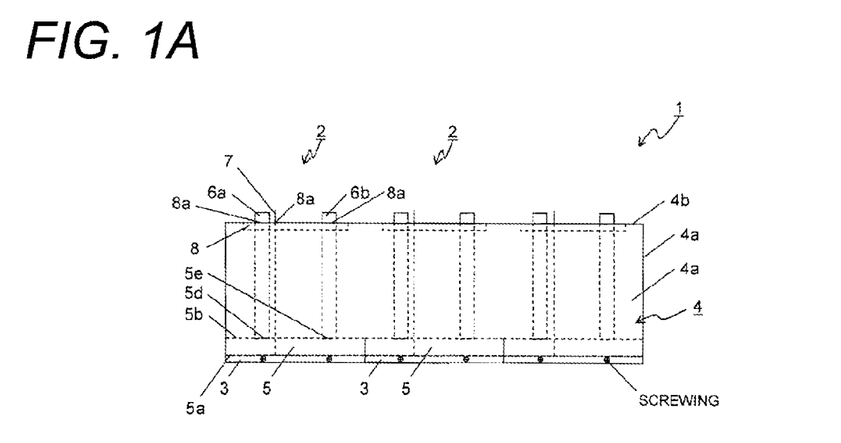
FIGS. 1A and 1B are a side view and a plan view, respectively, showing a light irradiation apparatus according to an embodiment of the invention.
Figure 1B:
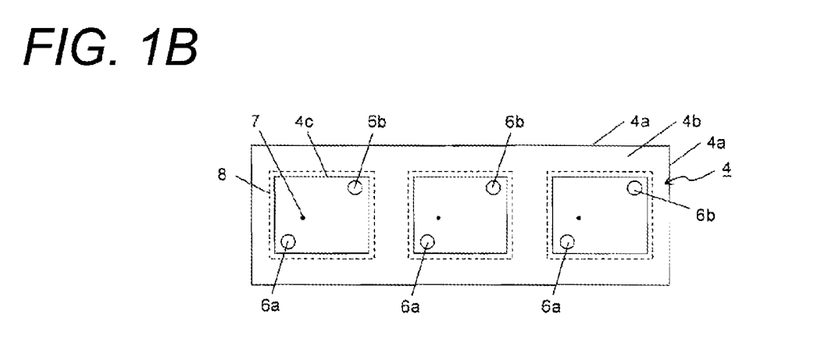

A light irradiation apparatus 1 as shown in FIGS. 1A and 1B functions as an ultraviolet-producing light source which is incorporated into a printing apparatus, such as an offset printer or ink-jet printer using an ultraviolet curable ink, to apply ultraviolet rays to a target object (recording medium) with adherent ultraviolet curable ink to cure the ultraviolet curable ink.

The light irradiation apparatus 1 comprises: a plurality of light irradiation modules 2 arranged; and a casing 4 which houses at least part of the light irradiation modules 2.

The light irradiation module 2 will be described first.

<Light Irradiation Module>

The light irradiation module 2 comprises: a light irradiation device 3 having a substrate 10 in which a plurality of light-emitting elements 20 are disposed on one main face 11a thereof; a heat-dissipating member 5 in which the light irradiation device 3 is disposed on a first main face 5a thereof; a cooling piping for supply 6a which supplies a coolant to a flow channel 5c provided inside the heat-dissipating member 5 and a cooling piping for discharge 6b which discharges a coolant from the flow channel 5c, each of which is connected to a second main face 5b of the heat-dissipating member 5, the second main face 5b being located to be opposite to the first main face 5a; an electrical wiring 7 connected to the light irradiation device 3, the electrical wiring 7 supplying power to the light irradiation device 3; and a cover 8 configured to face with the second main face 5b.

The light irradiation device 3 has a plurality of light-emitting elements 20 and thus serves as an ultraviolet-producing light source.

The heat-dissipating member 5 serves as a support for the light irradiation device 3, and serves also as a heatsink which dissipates heat liberated by the light irradiation device 3 to the outside. Materials having high heat conductivity, for example, various types of metal materials, ceramics, and resin materials are preferably used to form the heat-dissipating member 5. In the present embodiment, the heat-dissipating member 5 is made of copper.

Figure 2:
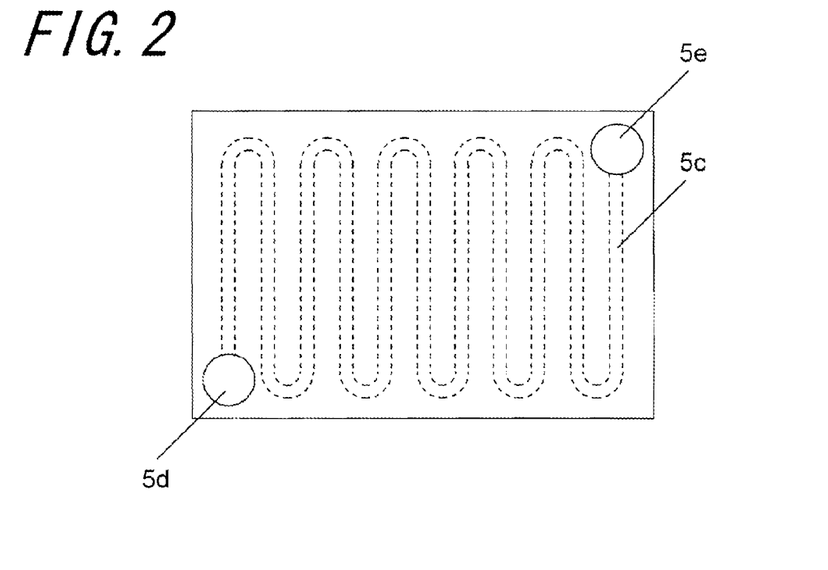
FIG. 2 is an explanatory drawing showing a flow channel of a heat-dissipating member.

The heat-dissipating member 5 is shown in FIG. 2. A flow channel 5c is provided inside the heat-dissipating member 5 for the passage of a flow of a coolant used to obtain higher heat dissipation capability. In the present embodiment, the flow channel 5c is formed so as to meander throughout the interior of the heat-dissipating member 5, and, a supply port 5d which supplying a coolant and a discharge port 5e which discharging a coolant are provided at the second main face 5b of the heat-dissipating member 5 so as to be located at opposite ends, respectively, of the flow channel 5c. It is advisable to adjust, for example, the shape of the flow channel 5c and the number of the supply port 5d and the discharge port 5e properly in conformity with cooling conditions for the light irradiation device 3.

The cooling piping for supply 6a and the cooling piping for discharge 6b are connected to the supply port 5d and the discharge port 5e, respectively, formed at the second main face 5b of the heat-dissipating member 5.

The cover 8, which is opposed to the second main face 5b, has through holes 8a through which are passed the cooling piping for supply 6a, the cooling piping for discharge 6b, and the electrical wiring 7 which are connected to the second main face 5b. The electrical wiring 7 may be disposed on both sides of the cover 8 via an electrical wiring terminal passing through the through hole 8a. The cover 8 in a condition of abutting on the casing 4, which will hereafter be described, acts to protect the light irradiation device 3, the heat-dissipating member 5, part of the cooling piping for supply 6a and the cooling piping for discharge 6b, and part of the electrical wiring 7 from surroundings externally of the light irradiation apparatus 1.

In the present embodiment, the cover 8 is made of aluminum shaped in a flat plate. The cover 8 may be given any shape that can abut on the casing 4 which will hereafter be described. The material used for the cover 8 is not limited to aluminum, and the cover 8 may thus be made of other metal material such as iron or stainless steel, or made of resin or the like without limitation to metal materials. From the viewpoint of imparting a lighter weight, heat dissipation capability, and resistance to corrosion to the light irradiation apparatus 1, aluminum is adopted as the material used for the cover 8 in the present embodiment.

Now, the light irradiation device 3 will be described.

<Light Irradiation Device>

Figure 3:
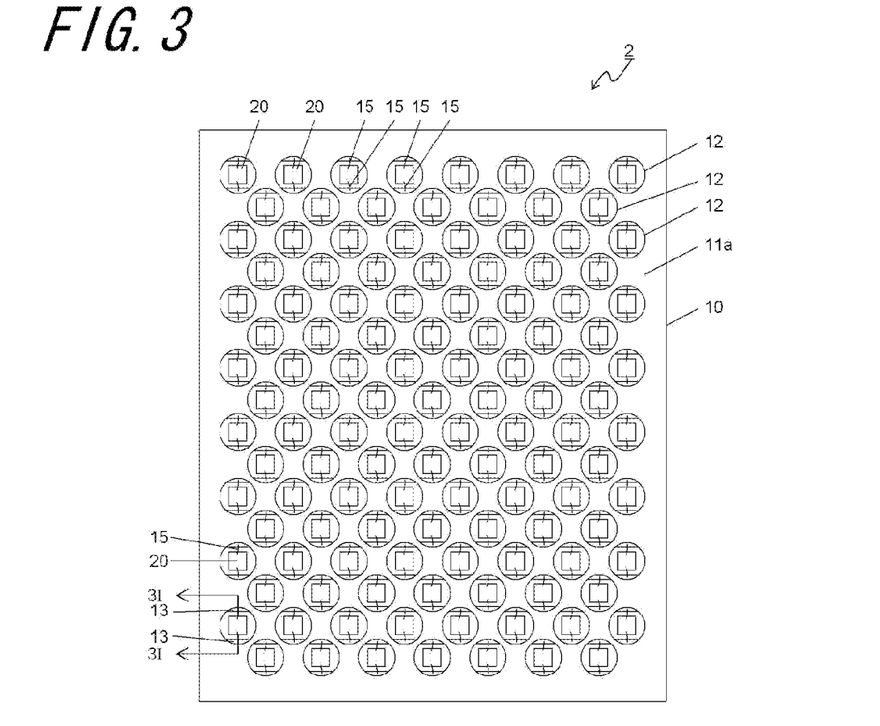
FIG. 3 is an explanatory drawing showing a light irradiation device constituting the light irradiation apparatus shown in FIGS. 1A and 1B.
Figure 4:
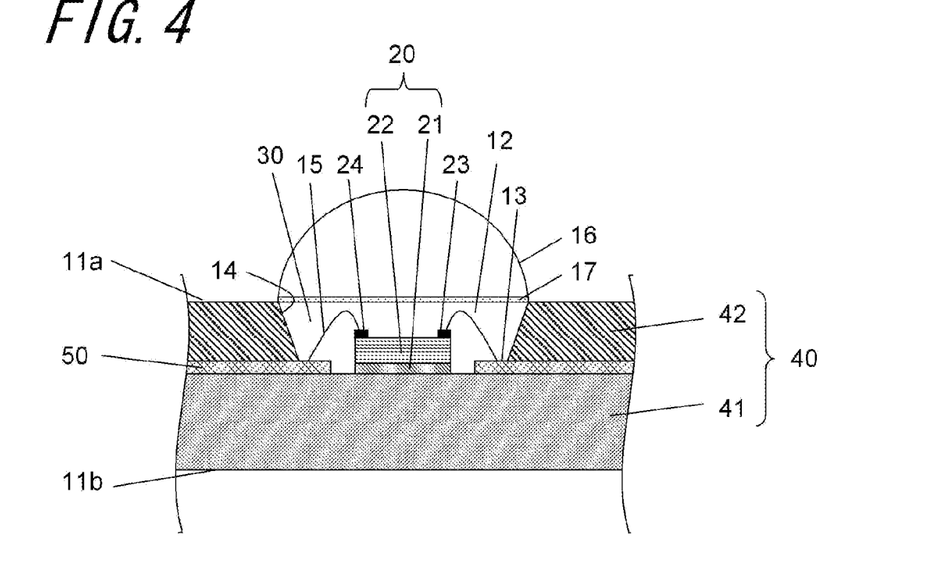
FIG. 4 is a sectional view of the light irradiation device taken along the line 31-31 in FIG. 3.

The light irradiation device 3 shown in FIGS. 3 and 4 comprises: a substrate 10 having a plurality of openings 12 formed at one main face 11a thereof; a plurality of connection pads 13 disposed inside each opening 12; a plurality of light-emitting elements 20 disposed inside the respective openings 12 of the substrate 10 so as to be electrically connected to the connection pads 13; a plurality of sealing materials 30 charged in the respective openings 12 so as to cover the light-emitting elements 20; and optical lenses 16 provided in correspondence to the respective openings 12.

The substrate 10 comprises: a stacked body 40 in which a first insulating layer 41 and a second insulating layer 42 are laminated; and an electrode wiring 50 which provides connection between the light-emitting elements 20. The substrate 10 is rectangular-shaped when seen in a plan view from above one main face 11a, and, the light-emitting element 20 is supported inside the opening 12 formed at the one main face 11a.

For example, the first insulating layer 41 is made of ceramics such as an aluminum oxide sintered body, an aluminum nitride sintered body, a mullite sintered body, or glass ceramics, or a resin such as epoxy resin or a liquid crystal polymer (LCP).

The electrode wiring 50, which is formed in a predetermined pattern from an electrically conductive material such for example as tungsten (W), molybdenum (Mo), manganese (Mn), or copper (Cu), serves as a feeder wiring for supplying electric current to the light-emitting element 20 or electric current from the light-emitting element 20.

In the second insulating layer 42 laminated on the first insulating layer 41 are formed the openings 12 passing through the second insulating layer 42.

An inner peripheral surface 14 of each opening 12 is inclined so that the hole diameter becomes larger gradually from a placement surface for the light-emitting element 20 toward one main face 11a of the substrate 10, and when seen in a plan view, the opening 12 has a circular shape. The opening shape is not limited to the circular shape, but may be a rectangular shape.

The opening 12 acts to cause light emitted from the light-emitting element 20 to reflect upwardly from the inner peripheral surface 14 for enhancement in the efficiency of light extraction.

It is preferable that the second insulating layer 42 is made of a porous ceramic material which exhibits a relatively good reflectivity to light in the ultraviolet range, for example, an aluminum oxide sintered body, a zirconium oxide sintered body, or an aluminum nitride sintered body, to increase the efficiency of light extraction. Moreover, from the viewpoint of obtaining higher light extraction efficiency, it is advisable to provide a metal-made reflection film on the inner peripheral surface 14 of the opening 12.

The openings 12 are arranged in a matrix form over the entire area of one main face 11a of the substrate 10. For example, the openings 12 are disposed in a staggered arrangement, that is; they are arranged in zigzag form in a plurality of rows, so that the light-emitting elements 20 can be arranged more densely, with consequent enhancement in irradiance per unit area. As used herein, the term "staggered arrangement" also means that the openings are arranged in positions corresponding to lattice points of a rhombic lattice pattern.

In a case where an adequate level of irradiance per unit area can be obtained, for example, the openings may be arranged in a tetragonal lattice pattern. The arrangement is not limited to particular patterns.

Moreover, although only one light-emitting element 20 is disposed inside a single opening 12 in the present embodiment, a plurality of light-emitting elements 20 may be disposed inside a single opening 12.

In a case where the first insulating layer 41 and the second insulating layer 42 are made of ceramics or the like, the substrate 10 comprising the stacked body 40 composed of the first insulating layer 41 and the second insulating layer 42 thus far described is produced through the following procedural steps as described below.

First, a plurality of ceramic green sheets produced by a heretofore known method are prepared. Holes that serve as the openings 12 are formed in a ceramic green sheet for the opening 12 by means of punching or otherwise. Next, green sheets each bearing a metal paste which constitutes the electrode wiring 50 printed thereon (not shown in the drawing) are stacked together so that the printed metal paste lies between the green sheets and at a location corresponding to the other main face 11b of the substrate 10. Exemplary of the metal paste constituting the electrode wiring 50 is a paste containing a metal such for example as tungsten (W), molybdenum (Mo), manganese (Mn), or copper (Cu). Next, the laminate is fired, that is; the green sheets and the metal paste are fired all together, thus forming the substrate 10 having the electrode wiring 50 and the openings 12.

Moreover, in a case where the first insulating layer 41 and the second insulating layer 42 are made of resin, for example, the following method can be adopted for the production of the substrate 10.

First, precursor sheets of thermosetting resin are prepared. Next, a metal-made lead terminal which constitutes the electrode wiring 50 is disposed between the precursor sheets, and the precursor sheets are laminated together so that the lead terminal is buried in the precursor sheets. Exemplary of the material constituting the lead terminal is a metal material such for example as copper (Cu), silver (Ag), aluminum (Al), an iron (Fe)-nickel (Ni)-cobalt (Co) alloy, or an iron (Fe)-nickel (Ni) alloy. After holes that serve as the openings 12 are formed in the precursor sheets by means of lasering, etching, or otherwise, the precursor sheets are thermally cured, thus completing the substrate 10. When the openings 12 are formed by lasering, the formation may be carried out after thermally curing the precursor sheets.

Meanwhile, inside the opening 12 of the substrate 10, there are provided: the connection pads 13 electrically connected to the light-emitting element 20; the light-emitting element 20 connected to the connection pads 13 via joining materials 15 such as solder, gold (Au) wires, or aluminum (Al) wires; and the sealing material 30 for sealing the light-emitting element 20.

The connection pad 13 is composed of a metal layer made of a metal material such for example as tungsten (W), molybdenum (Mo), manganese (Mn), or copper (Cu). For example, a nickel (Ni) layer, a palladium (Pd) layer, or a gold (Au) layer may additionally be laminated on the metal layer on an as needed basis. The connection pad 13 is connected to the light-emitting element 20 via the joining material 15 such as solder, a gold (Au) wire, or an aluminum (Al) wire.

Moreover, for example, the light-emitting element 20 is constructed of a light-emitting diode obtained by laminating an n-type semiconductor layer and a p-type semiconductor layer made of a semiconductor material such as gallium arsenide (GaAs) or gallium nitride (GaN) on an element substrate 21 such as a sapphire substrate, or an organic EL element having an organic material-made semiconductor layer.

The light-emitting element 20 comprises: a semiconductor layer 22 having a light-emitting layer; and element electrodes 23 and 24 made of a metal material such as silver (Ag), which are connected to the connection pad 13 disposed on the substrate 10 via the joining material 15 such as solder, a gold (Au) wire, or an aluminum (Al) wire. The light-emitting element 20 is connected to the substrate 10 by wire bonding. In response to an electric current flowing between the element electrodes 23 and 24, the light-emitting element 20 emits light having a predetermined wavelength at a predetermined luminance, and, and the light is caused to radiate out directly from the light-emitting element 20, or to radiate out through the element substrate 21. As is well known, the element substrate 21 may be omitted. Moreover, the connection between the element electrode 23, 24 of the light-emitting element 20 and the connection pad 13 may be made by the heretofore known flip-chip bonding technique using solder as the joining material 15.

The present embodiment adopts a LED which serves as the light-emitting element 20 for emitting UV light exhibiting a light emission spectrum whose peak wavelength falls in the range of, for example, 250 nm to 410 nm. That is, in the present embodiment, a UV-LED element is used as the light-emitting element 20. The light-emitting element 20 is formed by a heretofore known thin-film forming technique.

The light-emitting element 20 is sealed by the aforestated sealing material 30.

An insulating material such as a light-transmittable resin material is used as the sealing material 30. The sealing material 30, which seals the light-emitting element 20 successfully, provides protection for the light-emitting element 20 by, for example, preventing intrusion of external moisture or absorbing external impact.

Moreover, the use of a material having a refractive index which falls in between the refractive index of the element substrate 21 constituting the light-emitting element 20 (1.7 when a sapphire substrate is used) and the refractive index of air (about 1.0), for example, the use of a silicone resin having a refractive index of about 1.4, makes it possible to increase the efficiency of extraction of light from the light-emitting element 20.

After the light-emitting element 20 is mounted on the substrate 10, the sealing material 30 is formed by charging a precursor of a silicone resin or the like into the opening 12, and subsequently curing the precursor.

The optical lens 16 is disposed on the sealing material 30, with a lens adhesive 17 interposed between them, so as to cover the light-emitting element 20. In the light irradiation device 3 of the present embodiment, a plano-convex lens is used as the optical lens 16. Thus, the optical lens 16 of the present embodiment is so configured that one main face is convexly curved, whereas the other main face is made flat, that is; its cross-sectional area becomes smaller gradually from the other main face toward one main face.

The optical lens 16, which is made of silicone resin for example, acts to condense light emitted from the light-emitting element 20. Examples of the material used for the optical lens include, in addition to the aforementioned silicone resin, plastics such as thermosetting resins including urethane resin and epoxy resin, and thermoplastic resins including polycarbonate resin and acryl resin; sapphire; and inorganic glass. For example, when the light irradiation device 3 and a target object are close to each other and there is thus no need to condense light, the optical lens 16 may be omitted.

As described above, the light irradiation device 3 of the present embodiment is of a surface-emitting type in which the plurality of light-emitting elements 20 are arranged in the matrix form over the entire area of one main face 11a of the substrate 10. Alternatively, the light irradiation device 3 may be of a line-emitting type in which the plurality of light-emitting elements 20 are aligned in a row on one main face 11a of the substrate 10, or a type which comprises a single light-emitting element 20.

A large light irradiation apparatus 1 is constructed by arranging a plurality of light irradiation modules 2 comprising the light irradiation devices 3.

In the present embodiment, the light irradiation apparatus 1 has an elongated form in which three light irradiation devices 3 are aligned in a row. The arrangement of the light irradiation devices 3 is not limited to particular patterns, and the light irradiation devices 3 may be aligned in a row, or may be arranged in a plurality of rows so that the individual rows differ from one another in the number of the light irradiation devices 3. It is thus advisable to adjust the arrangement in conformity with the required light irradiation performance capability.

The casing 4 accommodates at least part of a plurality of the light irradiation modules 2 thereby arranged. The expression "part of the light irradiation modules" as used in the description of the present embodiment refers specifically to a range encompassing the light irradiation devices 3 and the cover 8. That is, parts of the cooling piping for supply 6a, the cooling piping for discharge 6b, and the electrical wiring 7 passing through the cover 8 which lie on an opposite side of the cover 8 to the light irradiation device 3 are located externally of the casing 4 without being housed in the casing 4.

The casing 4 comprises: a plurality of side-covers 4a disposed along a direction from the light irradiation device 3 toward the cover 8 and configured to surround a plurality of the light irradiation modules 2; and an under-cover 4b which is connected to each side-cover 4a, contacts with a portion of the cover 8 of each of the plurality of light irradiation modules, and has a plurality of first openings 4c through which the cooling piping for supply 6a, the cooling piping for discharge 6b, and the electrical wiring 7 are passed. The side-covers 4a include a plurality of side-members. The side-members are each also designated by a symbol 4a in the drawings. The light irradiation module 2 is connected to at least one of the side-cover 4a and the under-cover 4b constituting the casing 4. The side-cover 4a is screw-held to an end face 5f connected to the first main face 5a and the second main face 5b of the heat-dissipating member 5 constituting the light irradiation module 2 in the present embodiment. In the case of the present embodiment, the side-cover 4a is screw-held to each light irradiation device 3 at two points at each of two end faces arranged along a direction in which the light irradiation devices 3 are arranged. The adjacent side-covers 4a are also connected to each other by screwing, and, since separate side-covers 4a are connected to each other, and so are the side-cover 4a and the under-cover 4b, it follows that the casing 4 serves as a support for supporting the light irradiation module 2, and also acts to accommodate the cooling piping for supply 6a, the cooling piping for discharge 6b, and the electrical wiring 7, as well as to protect the light irradiation module 2 from external surroundings. Although the side-cover 4a and the under-cover 4b are each shaped in a flat plate in the present embodiment, the shape is not limited to the flat plate, and the side-cover 4a and the under-cover 4b may thus be given any shape that achieves the aforestated functions of the casing 4.

The side-cover 4a and the under-cover 4b constituting the casing 4 are each made of a metal material such as aluminum, iron, or stainless steel. The side-cover 4a and the under-cover 4b may be made of resin or the like without limitation to metal materials. From the viewpoint of imparting a lighter weight, heat dissipation capability, and resistance to corrosion to the light irradiation apparatus 1, aluminum is adopted as the material used for the casing 4 in the present embodiment.

In the present embodiment, aluminum is adopted as the material used for the casing 4, and the side-cover 4a constituting the casing 4 is screw-held to the heat-dissipating member 5 of the light irradiation module 2, wherefore the casing 4 in itself can be cooled. Thus, even if air within the casing 4 is warmed by heat liberated by the light irradiation module 2, or even if the electrical wiring 7 gives off heat, the casing 4 is capable of dissipating the heat.

In this construction in which the light irradiation modules 2 are each provided with the cooling piping for supply 6a, the cooling piping for discharge 6b, and the electrical wiring 7, the cover 8 of the light irradiation module 2 abuts, from an inside of the casing 4, on the under-cover 4b constituting the casing 4. This makes it possible to carry out maintenance of the light irradiation apparatus 1, such as replacement of the light-emitting element 20 and replacement of the light irradiation device 3, on a light irradiation module 2-by-light irradiation module 2 basis, and thereby accomplish maintenance operation with ease in a shorter period of time without the necessity of dismounting the light irradiation apparatus 1 as a whole.

<Embodiment of Printing Apparatus>

Figure 5:
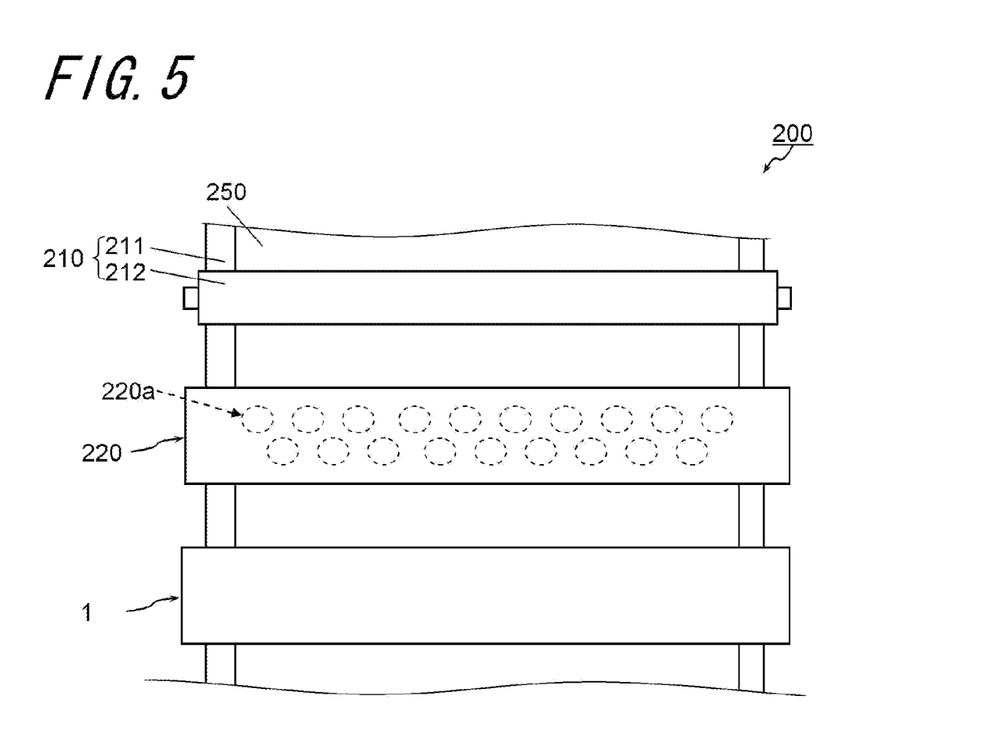
FIG. 5 is a top view of a printing apparatus employing the light irradiation apparatus shown in FIGS. 1A and 1B.
Figure 6:
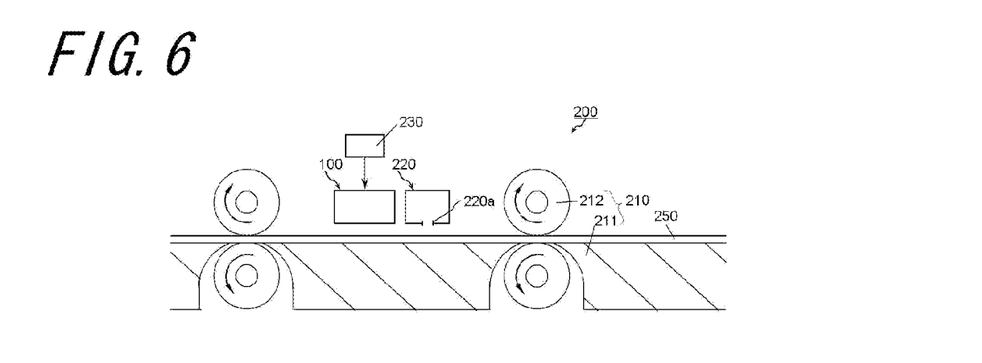
FIG. 6 is a side view of the printing apparatus shown in FIG. 5.

The following is a description of a printing apparatus 200 as shown in FIGS. 5 and 6 that exemplifies an embodiment of a printing apparatus pursuant to the invention. The printing apparatus 200 comprises: conveying means 210 which conveys a recording medium 250; a printing device 220 serving as a printing mechanism, printing on the recording medium 250 under conveyance; the above-described light irradiation apparatus 1 which applies ultraviolet light to the recording medium 250 printed; and a control system 230 which controls emission of light from the light irradiation apparatus 1. The recording medium 250 is equivalent to the aforementioned target object.

The conveying means 210, which is intended to convey the recording medium 250 so as to cause the recording medium 250 to pass through the printing device 220 and the light irradiation apparatus 1 sequentially in the order named, comprises: a placement table 211; and a pair of conveying rollers 212 configured to face with each other while being rotatably supported. The conveying means 210 conveys the recording medium 250 in a conveyance direction by feeding the recording medium 250 supported by the placement table 211 to a location between the pair of conveying rollers 212 while rotating the conveying rollers 212.

The printing device 220 acts to adhere a photosensitive material to the recording medium 250 which is being conveyed via the conveying means 210. The printing device 220 is configured to discharge droplets containing the photosensitive material toward the recording medium 250, thereby adhering the photosensitive material to the recording medium 250. In the present embodiment, an ultraviolet curable ink is adopted for use as the photosensitive material. Examples of the photosensitive material include, in addition to the ultraviolet curable ink, a photoresist and a photocurable resin.

In the present embodiment, line-type printing device is adopted for use as the printing device 220. The printing device 220 has a plurality of linearly arranged discharge holes 220*a*, and is configured so that the ultraviolet curable ink is discharged from the discharge holes 220*a*. The printing device 220 carries out printing on the recording medium by discharging the ink from the discharge holes 220*a* so that the ink adheres to the recording medium 250 which is being conveyed in a direction perpendicular to the arrangement of the discharge holes 220*a*.

Although the line-type printing device exemplifies the printing mechanism in the present embodiment, the printing mechanism is not limited to this. For example, serial-type printing device, or a line-type or serial-type spraying head (for example, ink-jet head) may be adopted instead. It is also possible to adopt, as the printing mechanism, an electrostatic head in which static electricity is caused to accumulate in the recording medium 250 for adhesion of a photosensitive material to the recording medium 250 under the static electricity, or an immersion device in which the recording medium 250 is immersed in a photosensitive material in liquid form for adhesion of the photosensitive material to the recording medium 250. Moreover, the printing mechanism may have another form, such as a brush coater, a brush, or a roller.

In the printing apparatus 200, the light irradiation apparatus 1 acts to expose the photosensitive material adherent to the recording medium 250 under conveyance via the conveying means 210 to light. The light irradiation apparatus 1 lies in a position spaced downstream from the printing device 220 in the conveyance direction. Moreover, in the printing apparatus 200, the light-emitting element 20 acts to expose the photosensitive material adherent to the recording medium 250 to light.

The control system 230 acts to control emission of light from the light irradiation apparatus 1. A memory of the control system 230 stores information indicative of the characteristics of light which allows ink droplets discharged from the printing device 220 to cure in a relatively satisfactory manner. Specific examples of the information stored in the memory include wavelength distribution characteristics and numerical values representing light emission intensity (emission intensity in each wavelength range) suited to curing the discharge of ink droplets. By virtue of this control system 230, the printing apparatus 200 of the present embodiment is also capable of adjusting the magnitude of driving current which is inputted to a plurality of the light-emitting elements 20 on the basis of the information stored in the control system 230. Thus, according to the printing apparatus 200 of the present embodiment, it is possible to achieve irradiation of light with adequate ultraviolet irradiation energy conforming to the characteristics of an ink in use, and thereby curable ink droplets with light of relatively low energy.

In the printing apparatus 200, the conveying means 210 conveys the recording medium 250 in the conveyance direction. The printing device 220 discharges an ultraviolet curable ink toward the recording medium 250 under conveyance for adhesion of the ultraviolet curable ink to the surface of the recording medium 250. At this time, the ultraviolet curable ink which is caused to adhere to the recording medium 250 may be applied to either the entire area or part of the area of the surface of the recording medium 250, or may be applied in a predetermined adherent pattern to the recording medium 250. In this printing apparatus 200, the ultraviolet curable ink adherent to the recording medium 250 is cured under irradiation of ultraviolet rays emitted from the light irradiation apparatus 1.

According to the present embodiment, the printing apparatus 200 affords the aforestated advantageous effects produced by the light irradiation apparatus 1.

Although specific embodiments of the invention have been shown herein, it will be understood that the invention is not limited to this, and thus many changes and modifications may be made therein without departing from the scope of the invention.

Figure 7:
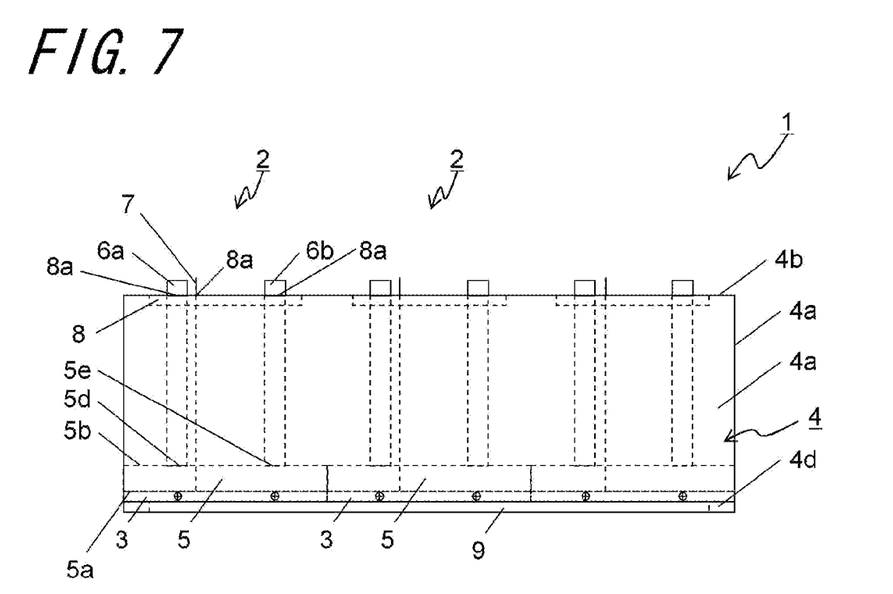
FIG. 7 is a side view showing a first modified example of the light irradiation apparatus shown in FIGS. 1A and 1B.

For example, as in a first modified example of the invention shown in FIG. 7, the casing 4 may additionally include a top-cover 4*d* disposed configured to face with the light irradiation device 3, the top-cover 4*d* being connected to each of the side-covers 4*a*. Second openings 4*f* are formed in positions of the top-cover 4*d* corresponding to the positions of the plurality of the light-emitting elements 20 of the light irradiation device 3, and, protective members 9 are disposed in positions of the top-cover 4*d* corresponding to the positions of the second openings 4*f*, respectively, through which is transmitted light emitted from the plurality of the light-emitting elements 20. In the present embodiment, the protective member 9 is made of quartz. In addition to quartz, any other material that exhibits high ultraviolet transmittance and is less prone to ultraviolet-induced quality degradation may be used for the protective member 9.

The placement of the top-cover 4*d* makes it possible to prevent contamination of the light irradiation device 3, and thereby prevent a decline in the intensity of light emitted from the light irradiation device 3 caused by contamination.

Figure 8:
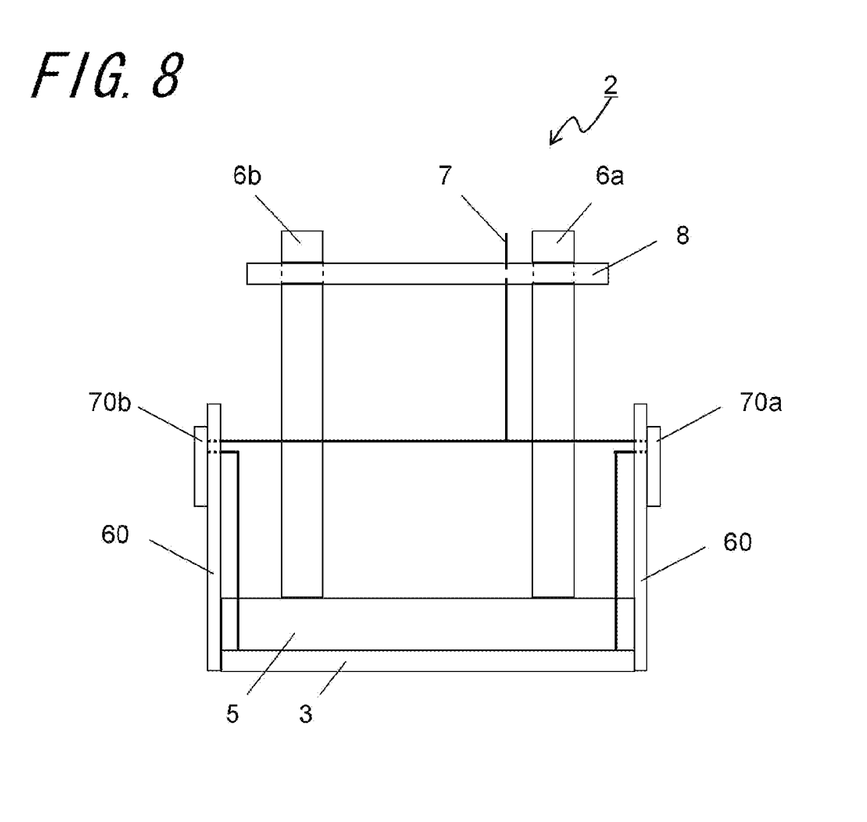
FIG. 8 is a side view of the light irradiation device, for explaining a second modified example of the light irradiation apparatus shown in FIGS. 1A and 1B.

Moreover, a light irradiation module 2 according to a second modified example is shown in FIG. 8. FIG. 8 is a side view showing the light irradiation module 2 when viewed in a direction in the light irradiation modules 2 are arranged. The light irradiation module 2 may further comprise a module base 60, and at least one of a control substrate 70*a* which controls the light irradiation device 3 and a counter substrate 70*b* which computes information on the light irradiation device 3, the at least one of the control substrate 70*a* and the counter substrate 70*b* being connected with electrical wiring 70 and the light irradiation device 3. In the second modified example, both the control substrate 70*a* and the counter substrate 70*b* are configured to face with the corresponding side-covers 4*a* disposed along the arrangement direction of the light irradiation devices 3.

The control substrate 70*a* and the counter substrate 70*b* are each constructed by mounting a plurality of electronic components on a wiring substrate made of ceramics or resin.

The module base 60 is connected to at least one of the heat-dissipating member 5, the light irradiation device 3, and the cover 8, and configured to face with the side-cover 4*a*. From the viewpoint of imparting a lighter weight, heat dissipation capability, and resistance to corrosion to the light irradiation apparatus 1, aluminum is adopted as the material used for the module base 6 in the present embodiment. The material used for the module base 6 is not limited to aluminum, and the module base 6 may thus be made of other metal material such as iron or stainless steel, or made of resin or the like without limitation to metal materials.

As described above, by disposing the control substrate 70*a* and the counter substrate 70*b* on the module base 6 opposed to the side-cover 4*a*, for example, when maintenance operation such as replacement of the control substrate 70*a* and the counter substrate 70*b* is required, the detachment and replacement of the control substrate 70*a* and the counter substrate 70*b* can be achieved simply by removing the side-cover 4*a* alone without the necessity of dismounting or disassembly of the light irradiation apparatus 1 as a whole.

Figure 9:
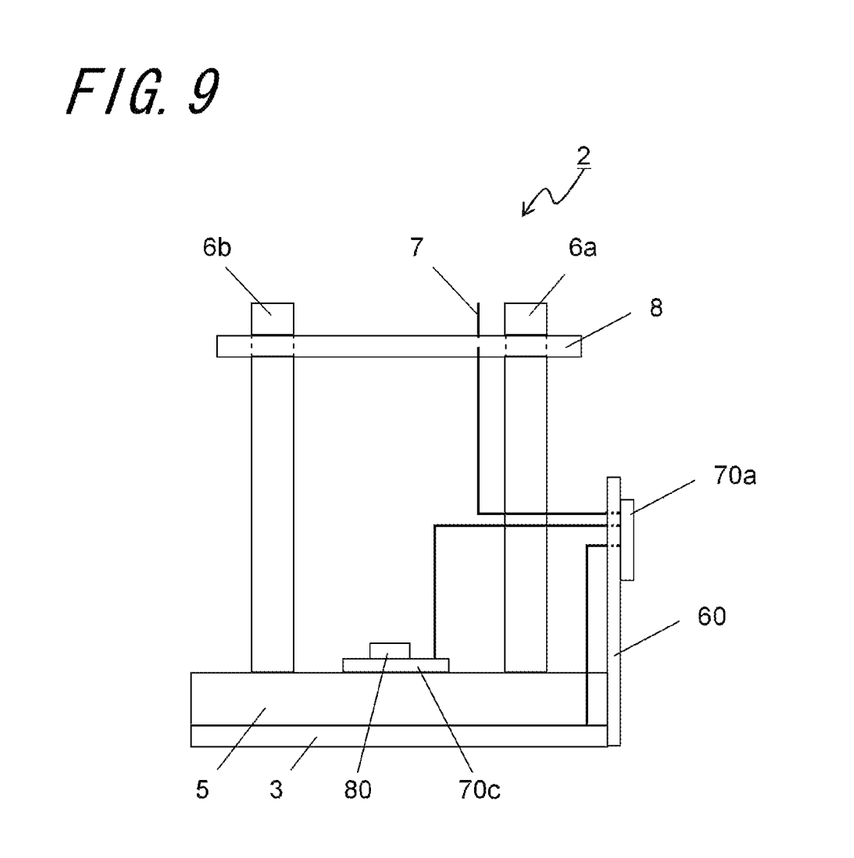
FIG. 9 is a side view of the light irradiation device, for explaining a third modified example of the light irradiation apparatus shown in FIGS. 1A and 1B.

Moreover, as in a third modified example shown in FIG. 9, the light irradiation module 2 may additionally include a drive substrate 70*c* which is connected to the control substrate 70*a* and has electrical connection to a constant-current generation device 80 the drive substrate 70*c* driving the plurality of light-emitting elements 20. The drive substrate 70*c* is connected to the light irradiation device 3, the constant-current generation device 80, and an external unit, and acts to drive a plurality of light-emitting elements 20. The constant-current generation device 80 may be disposed either on the second main face 5*b* of the heat-dissipating member 5 or on the drive substrate 70*c* disposed on the second main face 5*b*.

The constant-current generation device 80 of the third modified example is a FET (Field Effect Transistor) which serves as a constant current source for supplying constant current to a plurality of light-emitting elements 20. Although a FET (Field Effect Transistor) is adopted for use as the constant-current generation device 80 in the third modified example, the constant-current generation device 80 may be any other device that supplies constant current to a plurality of light-emitting elements 20, such as a CRD (Current Regulative Diode).

With respect to the constant-current generation device 80 of the third modified example, the drive substrate 70*c* bearing the constant-current generation device 80 is disposed on the second main face 5*b* of the heat-dissipating member 5 via, for example, an adhesive. This arrangement enables efficient dissipation of heat liberated by the constant-current generation device 80. Placing the constant-current generation device 80 directly on the second main face 5*b* of the heat-dissipating member 5 via e.g., an adhesive makes it possible to obtain higher heat-dissipation effect.

Figure 10:
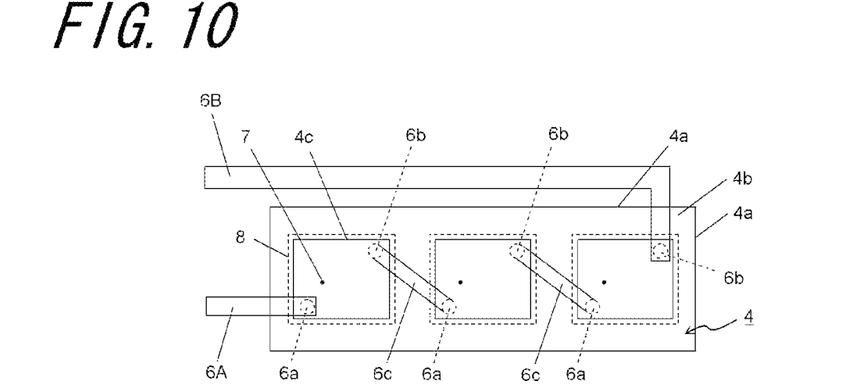
FIG. 10 is a plan view showing a fourth modified example of the light irradiation apparatus shown in FIGS. 1A and 1B.

Moreover, as in a fourth modified example shown in FIG. 10, the light irradiation apparatus 1 may be configured so that, except one of the cooling pipings for supply 6*a* and one of the cooling pipings for discharge 6*b*, a cooling piping for supply 6*a* in one of the light irradiation modules is connected to a cooling piping for discharge 6*b* in another one of the light irradiation modules by a coupling piping 6*c*. This arrangement enables sequential connection of the flow channels 5*c* of the heat-dissipating members 5 in the individual light irradiation modules 2. Furthermore, the cooling piping for supply 6*a* and the cooling piping for discharge 6*b* of the light irradiation device 3 left unconnected to the corresponding cooling piping for discharge 6*b* and the corresponding cooling piping for supply 6*a*, respectively, are simply connected to an external supply piping 6A for supplying a coolant and an external discharge piping 6B, respectively, that are disposed externally of the apparatus. This helps simplify the construction.

Figure 11:
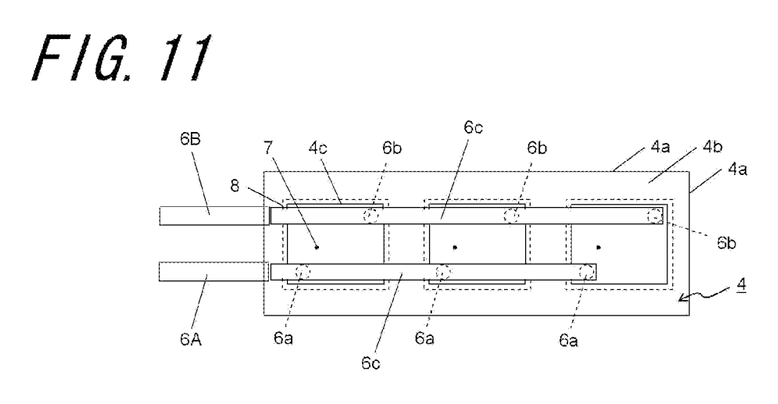
FIG. 11 is a plan view showing a fifth modified example of the light irradiation apparatus shown in FIGS. 1A and 1B.

Moreover, as in a fifth modified example shown in FIG. 11, the light irradiation apparatus 1 may be configured so that cooling pipings for supply 6*a* are connected to each other, and that cooling pipings for discharge 6*b* are connected to each other. In this case, an external supply piping for supplying a coolant and an external discharge piping, which are each disposed externally of the apparatus, are connected to the cooling pipings for supply 6*a* and the cooling pipings for discharge 6*b*, respectively. This arrangement enables parallel connection of the flow channels 5*c* of the heat-dissipating members in the individual light irradiation modules 2, and, the flow channels 5*c* of the light irradiation devices 3 are each connected directly to the external supply piping for supplying a coolant disposed externally of the apparatus, thus rendering the cooling capabilities of the individual light irradiation devices 3 uniform. Furthermore, the coupling piping 6*c* providing connection between the cooling pipings for supply 6*a* and the coupling piping 6*c* providing connection between the cooling pipings for discharge 6*b* are simply connected to the external supply piping 6A for supplying a coolant and the external discharge piping 6B, respectively, that are disposed externally of the apparatus. This helps simplify the construction.

Moreover, the printing apparatus 200 is not limited to the embodiment thus far described. For example, the printing apparatus 200 may be of a so-called offset printer in which a roller which is supported by a shaft is rotated about the shaft so that a recording medium is conveyed along the surface of the roller. Also in this case, the same effects can be attained.

Although, in the aforestated embodiments, the light irradiation apparatus 1 is applied to the printing apparatus 200 employing an ink-jet head as the printing device 220, the light irradiation apparatus 1 can find applications in the curing of different photocurable resins. For example, the light irradiation apparatus 1 can be applied to specific-purpose curing apparatus for curing a photocurable resin spin-coated to the surface of a target object. Moreover, the light irradiation apparatus 1 may be used as an irradiation light source for an exposure unit.

REFERENCE SIGNS LIST

1: Light irradiation apparatus
2: Light irradiation module
3: Light irradiation device
4: Casing
4*a*: Side-cover (Side-member)
4*b*: Under-cover
4*c*: First opening
4*d*: Top-cover
4*f*: Second opening
5: Heat-dissipating member 5a: First main face
5b: Second main face
5c: Flow channel
5d: Supply port
5e: Discharge port
5f: End face
6a: Cooling piping for supply
6b: Cooling piping for discharge
6c: Coupling piping
6A: External supply piping
6B: External discharge piping
7: Electrical wiring
8: Cover
8a: Through hole
9: Protective member
10: Substrate
11a: One main face
11b: Other main face
12: Opening
13: Connection pad
14: Inner peripheral surface
15: Joining material
16: Optical lens
17: Lens adhesive
20: Light-emitting element
21: Element substrate
22: Semiconductor layer
23, 24: Element electrode
30: Sealing material
40: Stacked body
41: First insulating layer
42: Second insulating layer
50: Electrode wiring
60: Module base
70a: Control substrate
70b: Counter substrate
70c: Drive substrate
80: Constant-current generation device
200: Printing apparatus
210: Conveying means
211: Placement table
212: Conveying roller
220: Printing device
220a: Discharge hole
230: Control system
250: Recording medium

The invention claimed is:

1. A light irradiation apparatus, comprising:
a plurality of light irradiation modules arranged; and
a casing which houses at least part of the plurality of light irradiation modules, wherein
the plurality of light irradiation modules each comprises
a light irradiation device in which a plurality of light-emitting elements are disposed on one main face thereof,
a heat-dissipating member in which the light irradiation device is disposed on a first main face thereof,
a cooling piping for supply which supplies a coolant to a flow channel provided inside the heat-dissipating member and a cooling piping for discharge which discharges a coolant from the flow channel, each of which is connected to a second main face of the heat-dissipating member, the second main face being located to be opposite to the first main face,
an electrical wiring connected to the light irradiation device, the electrical wiring supplying power to the light irradiation device, and
a cover configured to face with the second main face of the heat-dissipating member, the cover comprising through holes through which the cooling piping for supply, the cooling piping for discharge, and the electrical wiring are passed,
the casing comprises
a side-cover disposed along a direction from the light irradiation device toward the cover and configured to surround the plurality of light irradiation modules, and
an under-cover which is connected to the side-cover, contacts with a portion of the cover of each of the plurality of light irradiation modules, and has openings through which the cooling piping for supply, the cooling piping for discharge, and the electrical wiring are passed.

2. The light irradiation apparatus according to claim 1, wherein
the casing further comprises a top-cover, and
the top-cover which is connected to the side-cover, is configured to face with the light irradiation device, and comprises a protective member through which light emitted from the plurality of light-emitting elements is transmitted.

3. The light irradiation apparatus according to claim 1, wherein
the side-cover comprises a plurality of side-members, and
the under-cover is connected to each of the side-members of the side-cover.

4. The light irradiation apparatus according to claim 2, wherein
the side-cover comprises a plurality of side-members, and
the top-cover is connected to each of the side-members of the side-cover.

5. The light irradiation apparatus according to claim 1, wherein the light irradiation module further comprises:
a module base connected to at least one of the heat-dissipating member, the light irradiation device, and the cover, and configured to face with the side-cover, and
at least one of a control substrate which controls the light irradiation device and a counter substrate which computes information on the light irradiation device, the at least one of the control substrate and the counter substrate being mounted on the module base where the side-cover is closer , and being connected with the electrical wiring and the light irradiation device.

6. The light irradiation apparatus according to claim 5, wherein
the light irradiation module further comprises a drive substrate which is connected to the control substrate, has electrical connection to a constant-current generation device, and drives the plurality of light-emitting elements, and
the constant-current generation device is disposed on the second main face of the heat-dissipating member or on the drive substrate disposed on the second main face.

7. The light irradiation apparatus according to claim 1, wherein the light irradiation apparatus is configured so that, except one of the cooling pipings for supply and one of the cooling pipings for discharge, a cooling piping for supply in one of the light irradiation modules is connected to a cooling piping for discharge in another one of the light irradiation modules.

8. The light irradiation apparatus according to claim 1, wherein the light irradiation apparatus is configured so that cooling pipings for supply are connected to each other, and that cooling pipings for discharge are connected to each other.

9. A printing apparatus, comprising:
a printing device printing on a recording medium; and
the light irradiation apparatus according to claim 1, the light irradiation apparatus applying light to the recording medium printed.

* * * * *